United States Patent
Murakami

[19]

[11] Patent Number: 6,152,843
[45] Date of Patent: Nov. 28, 2000

[54] PULLEY STRUCTURE OF BELT DRIVEN CONTINUOUSLY VARIABLE TRANSMISSION

[75] Inventor: Shinya Murakami, Tokyo, Japan

[73] Assignee: Fuji Jukogyo Kabushiki Kaisha, Tokyo, Japan

[21] Appl. No.: 09/268,749

[22] Filed: Mar. 17, 1999

[30] Foreign Application Priority Data

Mar. 30, 1998 [JP] Japan .................................. 10-084487

[51] Int. Cl.[7] .................................................. F16H 55/56
[52] U.S. Cl. .......................................................... 474/28
[58] Field of Search .................................. 474/18, 28, 70, 474/43, 179; 92/106, 117 R, 117 A

[56] References Cited

U.S. PATENT DOCUMENTS

| 3,014,378 | 12/1961 | Bruet | 474/28 |
|---|---|---|---|
| 4,348,197 | 9/1982 | Oliver | 474/28 |
| 4,560,369 | 12/1985 | Hattori | 474/28 |
| 5,427,578 | 6/1995 | Iijima | 474/28 X |

FOREIGN PATENT DOCUMENTS

| 0560427 A1 | 9/1993 | European Pat. Off. . |
|---|---|---|
| 63-199960 | 8/1988 | Japan . |
| 4-79733 | 12/1992 | Japan . |
| 7-35211 | 2/1995 | Japan . |
| 9-217802 | 8/1997 | Japan . |

OTHER PUBLICATIONS

Patent Abstracts of Japan, Publication No. 01026062, dated Jan. 1989.
Patent Abstracts of Japan, Publication No. 61065953, dated Apr. 1986.

Primary Examiner—Charles A Marmor
Assistant Examiner—Ankur Parekh
Attorney, Agent, or Firm—Smith Gambrell & Russell, LLP

[57] ABSTRACT

A pulley structure of a belt driven continuously variable transmission includes a fixed sheave, a moving sheave, a cylinder member fixed to the moving sheave, a piston member fixed to a pulley shaft and a hydraulic actuator formed by the cylinder member and the piston member for actuating the cylinder member so as to move the moving sheave axially on the pulley shaft. The pulley structure further includes a mating section integrally formed with the cylinder member, a mating surface on the mating section and formed annularly around and perpendicularly to the pulley shaft, a flange surface provided on the moving sheave and formed annularly around and perpendicularly to the pulley shaft, a mating means for mating the mating surface with the flange surface so as to have a tight contact therebetween, a bolt hole bored on the mating section, a tapped hole provided on the moving sheave, and a fastening means for fastening the mating section to the moving sheave with bolts. The surface of the mating section opposite the mating surface is part of a wall defining the oil pressure chamber of the hydraulic actuator.

6 Claims, 6 Drawing Sheets

PULLEY STRUCTURE OF BELT DRIVEN CONTINUOUSLY VARIABLE TRANSMISSION

BACKGROUND OF THE INVENTION

1. Field of the Invention

The present invention relates to the structure of a pulley of a belt driven continuously variable transmission and more particularly to a connecting structure between a moving sheave and a cylinder member or a piston member.

2. Prior Art

A belt driven continuously variable transmission comprises a primary (driving)shaft, a secondary (driven) shaft provided in parallel with the primary shaft, a primary pulley provided on the primary shaft, a secondary pulley provided on the secondary shaft and a drive belt looped over both of these pulleys, whereby the driving force is transmitted from the primary to the secondary pulley through the drive belt. The speed of the secondary shaft is varied continuously by changing a ratio of running diameters between both pulleys. The ratio of the running diameters is changed by regulating a groove width of both pulleys respectively.

Figure 5:
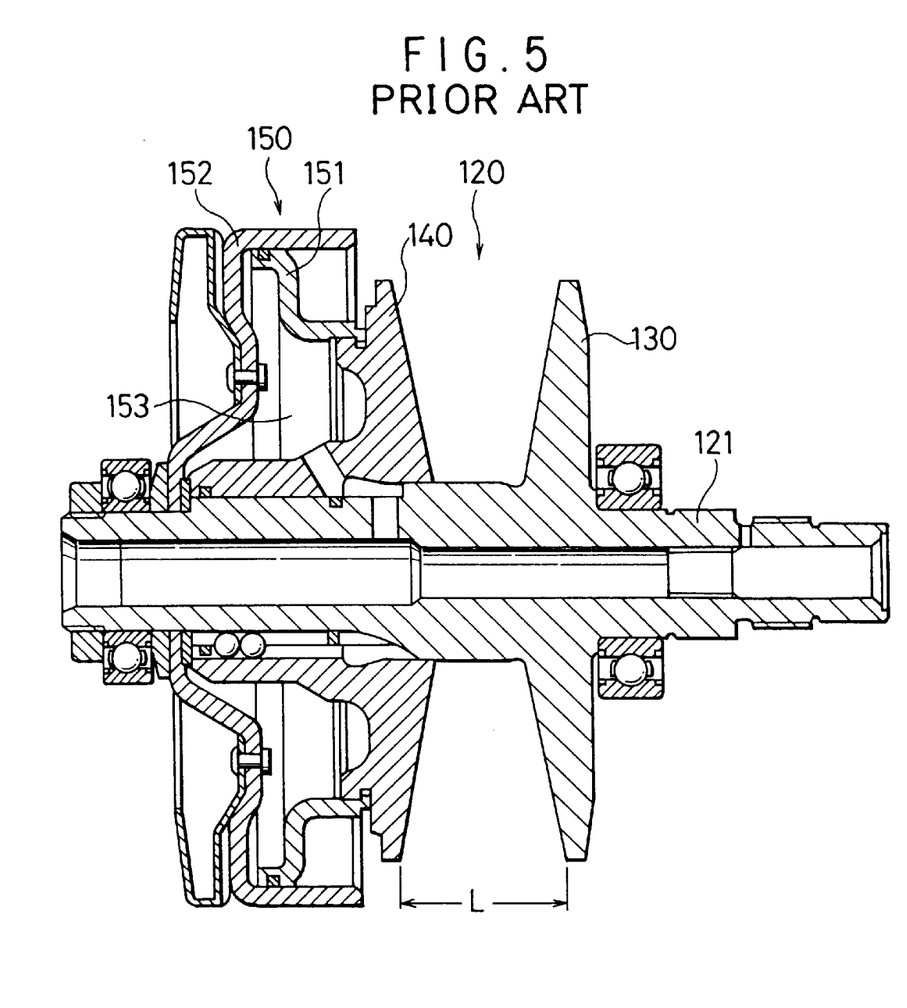
FIG. 5 is a sectional view of a primary pulley according to the prior art.

As shown in FIG. 5, for example, a primary pulley 120 includes a fixed sheave 121 integrally formed with a primary shaft 130, a moving sheave 140 axially movable toward and away from the fixed sheave 130 on the primary shaft 121 and a hydraulic actuator 150.

The hydraulic actuator 150 includes a piston member 151 fixedly connected at one end thereof with the back surface of the moving sheave 140, a cylinder member 152 engaged at one end of thereof with the primary shaft 121 and a hydraulic oil pressure chamber 153 formed by the piston member 151 and the cylinder member 152.

The moving sheave 140 is moved by hydraulic pressure supplied to the oil pressure chamber 153, whereby a groove width L formed by the fixed sheave 130 and the moving sheave 140 is variably controlled.

Figure 6A:
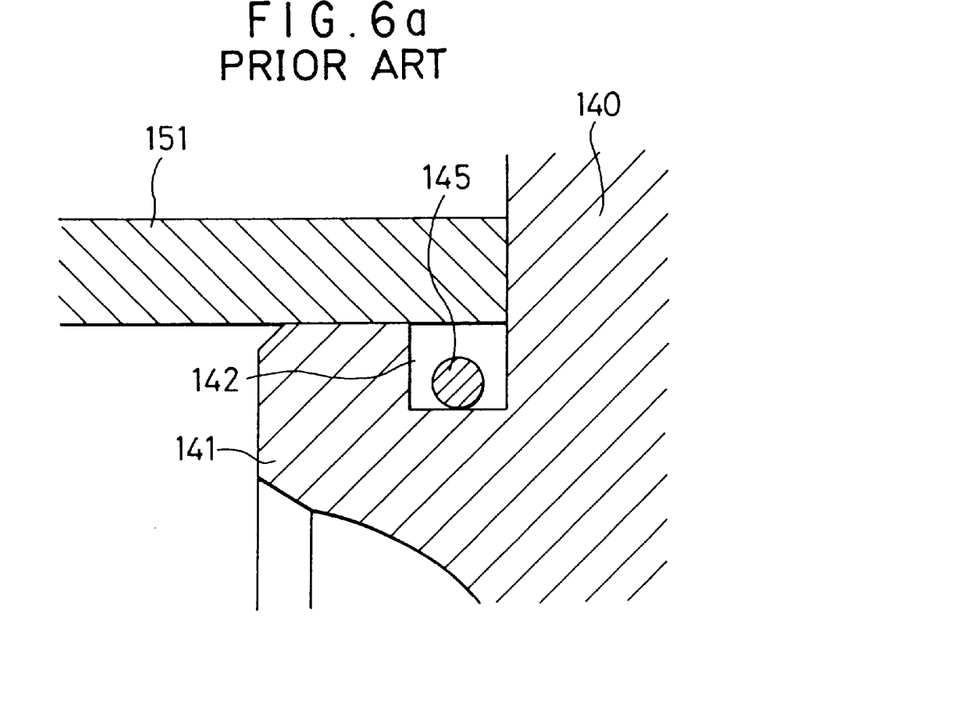
FIG. 6a is a partially enlarged view showing a connecting portion between a moving sheave and a piston member before applying a caulking thereto according to the prior art.
Figure 6B:
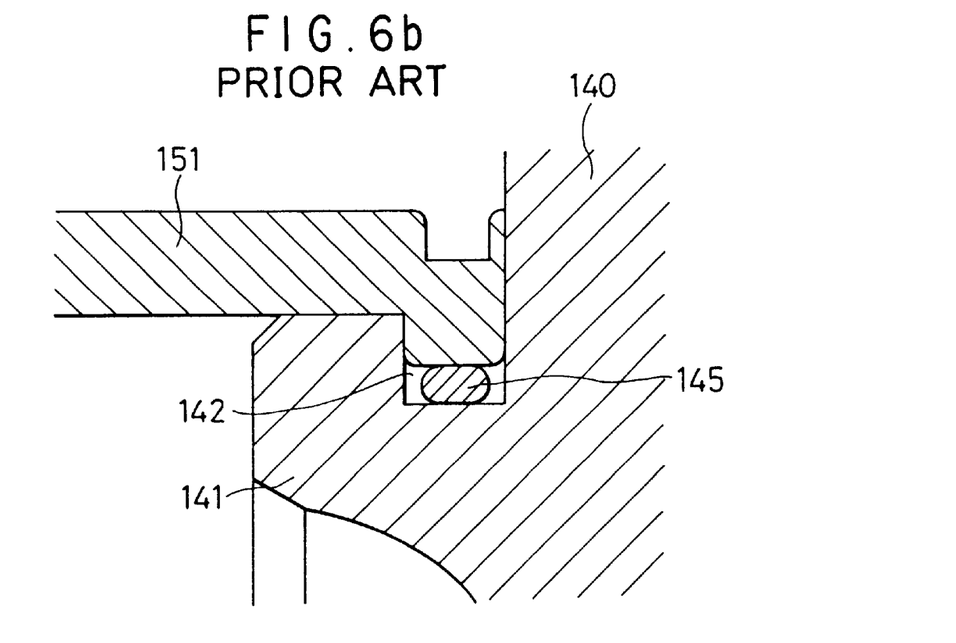
FIG. 6b is a partially enlarged view showing a connecting portion between a moving sheave and a piston member after applying a caulking thereto according to the prior art.

Therefore, it is required that the piston member 151 is rigidly connected with the moving sheave 140 so as to secure a tight and pressure proof seal. According to an example of the prior art, this rigid connection is realized in such a way as shown in FIGS. 6a and 6b. FIG. 6a is a partly sectional view of the connecting portion of the piston member 151 and the moving sheave 140. A seal member, for example, a rubber seal member 145 is inserted into an annular groove 142 provided on a flange section 141 formed on the back surface of the moving sheave 140. After an end portion of the piston member 151 is fitted to the outer periphery surface of the flange section 141, the end portion of the piston member 151, as shown in FIG. 6b, is caulked into the annular groove 142 so as to rigidly connect the piston member 151 with moving sheave 140.

As an example of the prior art of connecting the piston member with the back surface of the moving sheave by caulking, there is Japanese Patent Application Laid-open No. Toku-Kai-Hei 9-217802. In this prior art, the moving sheave has a flange section with an annular groove on the back surface thereof and a steel wire is wound around the bottom surface of the annular groove. After the piston member is fitted to the flange section, an end portion of the piston member is caulked. According to the prior art, since the end portion of the piston member is subject to a plastic deformation by the steel wire, both side faces of the annular groove can have a firm contact with the piston member with a small amount of caulking.

On the other hand, Examined Japanese Patent Application No. Toku-Kou-Hei 4-79733 discloses a caulking technique in which the piston member is caulked into the moving sheave by pressing the end portion of the piston member with a roller, while the piston member is rotated integrally with the moving sheave.

Further, Japanese Patent Application Laid-open No. Toku-Kai-Hei 7-35211 discloses a technique in which the moving sheave is connected with the cylinder member by press-fitting an end of the cylinder member into the outer periphery of a boss of the moving sheave.

Also, there is a technique in which the moving sheave is connected at the outer periphery of a flange section thereof with the cylinder member by mean of a beam welding and the like.

However, in order to secure a firm connection with tight sealing all over the periphery of the flange section of the moving sheave, the caulking amount of the piston member and the dimensional tolerances of the annular groove must be precisely controlled. An inadequate control of the caulking amount causes a lack of strength in the connecting portion, cracks or deformation in the piston member. Further, the pressing load applied to the roller must be accurately controlled. If the pressing load is too large, cracks or constrictions are caused in the piston member, and thereby the strength of the piston member is lowered.

Further, in the connecting technique according to Toku-Kai-Hei 9-217802, winding a steel wire around the annular groove increases the manufacturing cost. Further, this technique requires a very precise control in the caulking amount to prevent cracks and constrictions from being caused in the piston member.

Further, the connecting technique according to Toku-Kai-Hei 7-35211 needs a press machine for press-fitting the cylinder member into the outer periphery of the moving sheave. In this case, also, a precise control of the press-fit amount is required so as to avoid the occurrence of cracks and the like. Further, in the case where the moving sheave is connected with the cylinder member by beam welding, a welding machine is needed and a means for avoiding the deformation of the cylinder member due to the thermal effect of welding is required.

SUMMARY OF THE INVENTION

It is therefore an object of the present invention to provide a pulley structure of a belt driven continuously variable transmission having an adequate strength and sealing characteristic in the connecting portion of the moving sheave with the actuator member such as the piston or cylinder member, without using a facility such as a caulking apparatus, a press-fitting machine, a welding machine or without using a sealing member.

To achieve the object, the pulley structure comprises a mating section integrally formed with a cylinder member, a mating surface provided on the mating section and formed annularly around and substantially perpendicularly to a pulley shaft, a flange surface provided on the moving sheave on the opposite side of a groove of the pulley and formed annularly around and substantially perpendicularly to the pulley shaft, a mating means for mating the mating surface with the flange surface so as to have a tight contact therebetween, a fitting hole bored roundly on the mating section coaxially with the pulley shaft, a fitting section projected from the flange surface of the moving sheave and shaped cylindrically around the pulley shaft, a fitting means for fitting the fitting section to the fitting hole, a bolt hole bored on the mating section, a tapped hole provided in the moving sheave in the direction substantially perpendicular to the flange surface, a bolt and a fastening means for fastening the mating section to the moving sheave with the bolt.

DETAILED DESCRIPTION OF THE INVENTION

Figure 1:
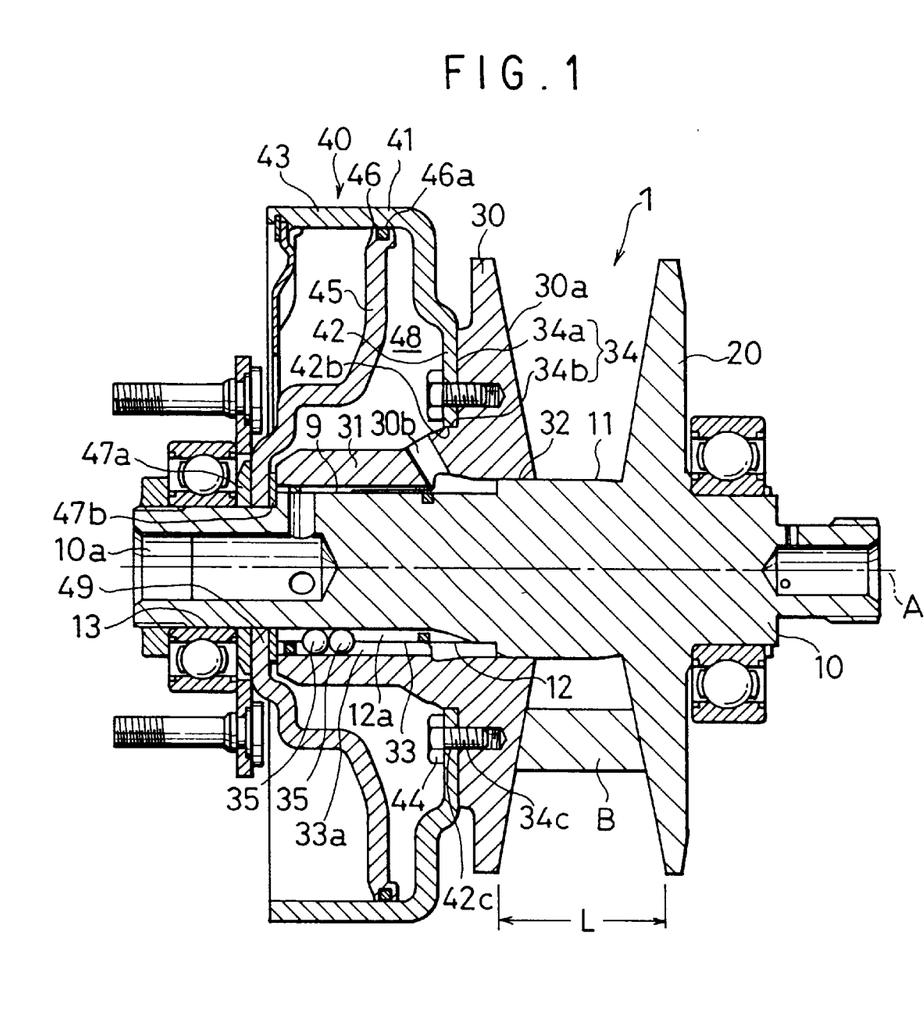
FIG. 1 is a sectional view of a primary pulley according to a first embodiment of the present invention.
Figure 2:
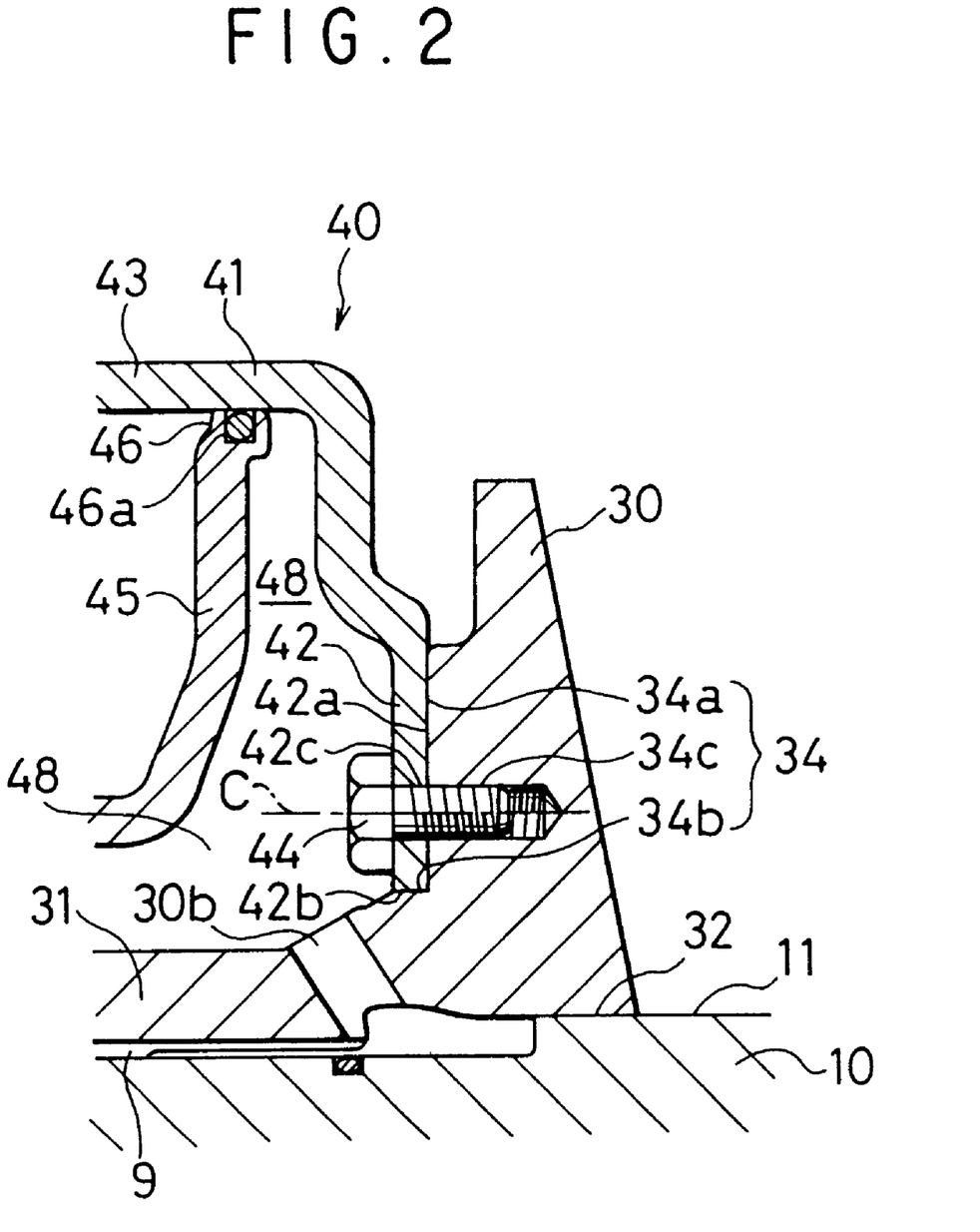
FIG. 2 is a partially enlarged view of a primary pulley shown in FIG. 1.

Referring now to FIGS. 1 and 2, a primary pulley 1 includes a primary shaft 10 driven by an engine and the like, a fixed sheave 20 integrally formed with the primary shaft 10, a moving sheave 30 movably fitted to the primary shaft 10 toward and away from the fixed sheave 20 and a hydraulic actuator 40 for moving the moving sheave 30 toward and away from the fixed sheave 20.

A drive belt B is held between the fixed sheave 20 and the moving sheave 30 with a suitable clamping force for transmitting torque. A groove width L formed by the fixed sheave 20 and the moving sheave 30 must be varied continuously and smoothly to obtain a desired speed ratio. For this purpose, a bottom section 11 of the primary pulley 10 is slidably fitted to a large diameter bore section 32 of a boss 31 of the moving sheave 30. Further, the boss 31 of the moving sheave 30 has a small diameter bore section on which a plurality of ball grooves 12a are provided in the axial direction and there are also provided a plurality of ball grooves 33a on the primary shaft 10 in a face-to-face relationship with the ball grooves 12a. The respective ball grooves 12a and 33a contain a plurality of balls 35 in between, and thereby torque is transmitted from the moving sheave 30 to the primary shaft 10.

Further, there is provided an oil passage 9 in a Clearance between a large diameter section 12 of the primary shaft 10 and the small diameter bore section 33 of the moving sheave 30. One end of the oil passage 9 communicates with an oil passage 10a formed in the primary shaft 10 and the other end thereof Communicates with an oil pressure chamber 48 of a hydraulic actuator 40 through an oil passage 30b provided in the moving sheave 30.

Further, on the back surface of a pulley groove surface 30a of the moving sheave 30, an annular and flat flange surface 34a is formed by machining around an axis A of the pulley shaft perpendicularly thereto and a cylindrically machined fitting section 34b projected from the flange surface 34a is formed coaxially with the pulley axis A. Thus, the flange surface 34a and the fitting section 34b form an actuator mounting section 34. Further, a plurality of tapped holes 34c are provided on a center axis C in parallel with the pulley axis A on the flange surface 34a at an equal interval.

The hydraulic actuator 40 comprises a cylinder member 41 fixed on the actuator mounting section 34 of the moving sheave 30, a piston member 45 engaged with the primary shaft 10 and an oil pressure chamber 48 enclosed by the cylinder member 41 and the piston member 45.

The cylinder member 41 shaped by drawing has an annular and flat mating section 42 including a mating surface 42a which is perpendicular to the pulley axis A. The mating surface 42a is in a tight contact with the flange surface 34a. The mating section 42 is connected integrally with a cylindrical large diameter section 43 forming the outer periphery of the cylinder member 41 through a step section. Further, the mating section 42 has a circular fitting hole 42b bored coaxially with the axis A to be fitted in by the fitting section 34b of the moving sheave 30. The mating section 42 has a plurality of boltholes at positions corresponding to the respective taped holes 34c.

By fitting the fitting section 34b of the moving sheave 30 into the fitting hole 42b, the cylinder member 41 is correctly located with respect to the moving sheave 30 and further the cylinder member 41 is fastened to the moving sheave 30 by bolts 44 in a state where the mating surface 42a has tight contact with the flange surface 34a.

The piston member 45 has a hat-shaped cross section and includes a large diameter section 46 which fits to the inner periphery of the large diameter section 43 of the cylinder member 41 through a sealing member 46a, and a small diameter bore section 49 which fits over a small diameter section 13 of the primary shaft 10. The small diameter bore section 49 is fixed on the small diameter section 13 by a lock nut through a ball bearing for supporting the pulley shaft on a transmission case (not shown), a stopper members 47a is interposed between the ball bearing and one surface of the small diameter bore section 49 and a stopper member 47b is interposed between the other surface of the small diameter bore section 49 and an end portion of the ball groove 12a.

When hydraulic pressure in the oil pressure chamber 48 formed by the cylinder member 41 and the piston member 45 increases, the cylinder member 41 is pressed in the direction of the moving sheave 30 and the moving sheave 30 moves toward the fixed sheave 20 to increase the running diameter of the drive belt B. On the contrary, when hydraulic pressure in the oil pressure chamber 48 decreases, because of the force of the drive belt B, the moving sheave 30 is moved away from the fixed sheave 20 to reduce the running diameter of the drive belt.

The relative location of the moving sheave 30 with respect to the cylinder member 41 is determined by fitting the fitting hole 42b of the cylinder member 41 to the fitting section 34b projected from the flange surface 34a of the moving sheave 30.

Inserting a bolt 44 into the bolthole 42c and fastening the bolt 44 to the tapped hole 34c with a specified fastening torque, the cylinder member 41 can be mounted on the moving sheave 30 to secure a uniform connecting strength between the moving sheave 30 and the cylinder member 41.

Therefore, according to the connecting method of the present invention, facilities such as the caulking apparatus, the press-fitting machine, the welding machine and the like are not needed and also no such failures as cracks, constrictions and the like occur. Furthermore, troublesome control of the caulking amount and deformation due to the thermal effect can be avoided. As a result, the pulley structure having high quality and low cost can be obtained.

In the operating condition, since the moving sheave 30 is connected with the cylinder member 41 by a plurality of bolts 44 in the direction of the pulley shaft center A, the flange surface 34a of the moving sheave 30 has a tight contact with the mating surface 42a over an extended area. Further, since the hydraulic pressure in the oil pressure chamber 48 presses the cylinder member 41 upon the flange surface 34a of the moving sheave 30, the contact between the flange surface 34a and the mating surface 42a is enhanced. As a result, the sealing performance between the flange surface 34a and the mating surface 42a can be secured without using sealing materials.

Figure 3:
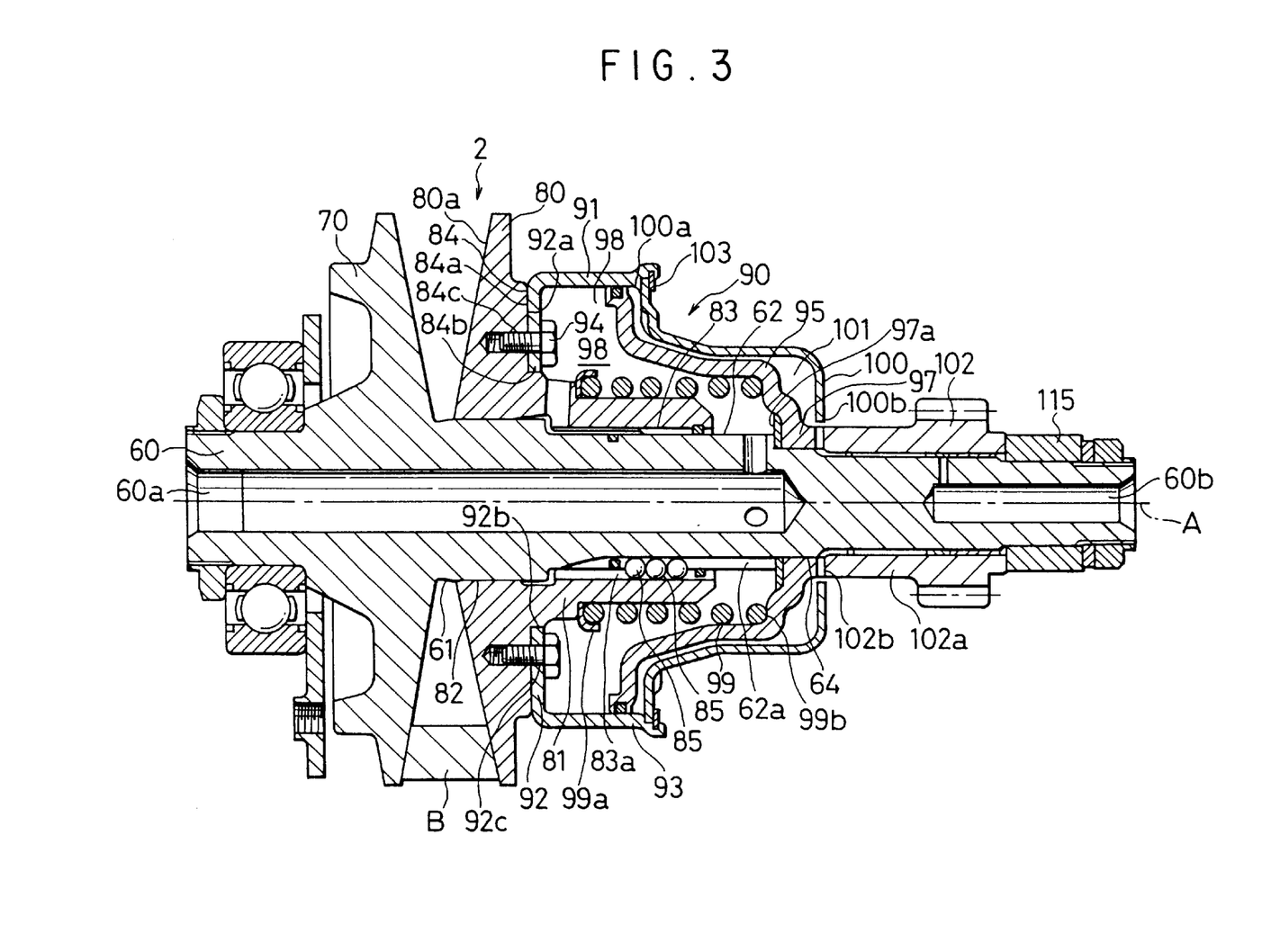
FIG. 3 is a sectional view of a secondary pulley according to a second embodiment of the present invention.
Figure 4:
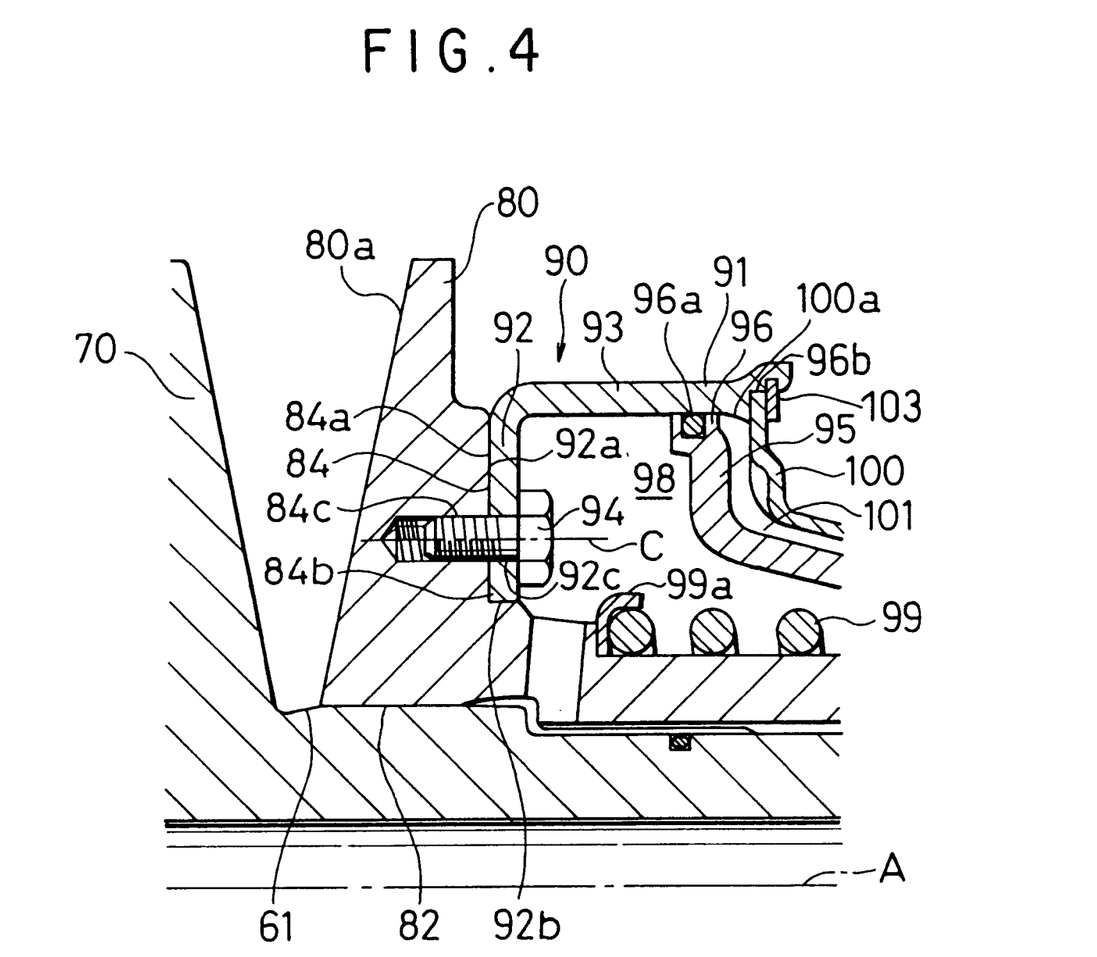
FIG. 4 is a partially enlarged view of a secondary pulley shown in FIG. 3.

Referring to FIGS. 3 and 4, an example of the pulley structure according to a second embodiment will be described.

A secondary pulley 2 comprises a fixed sheave 70 integrally formed with a secondary shaft 60, a moving sheave 80 movably fitted to the secondary shaft 60 toward and away from the fixed sheave 70 and a hydraulic actuator 90 for moving the moving sheave 80 toward and away from the fixed sheave 70.

The secondary shaft 60 is coupled with the moving sheave 80 in such a way that a pulley bottom portion 61 formed on the secondary shaft 60 is slidably fitted to a large diameter bore section 82 of a boss 81 and that a small diameter bore section 83 extended axially and a large diameter section 62 of the secondary shaft 60 respectively extended in the axial direction of the secondary shaft 60 are coupled with each other through a plurality of balls 85 being enclosed by ball grooves 62a and 83a arranged in a face-to-face relationship with each other, which are formed on the large diameter section 62 and the small diameter bore section 83, respectively. Torque is transmitted through the balls 85.

Further, on the back surface of a pulley groove surface 80a of the moving sheave 80, an annular and flat flange surface 84a is formed by machining around a pulley shaft center A perpendicularly thereto and a cylindrically machine-shaped fitting section 84b projected from the flange surface 84a is formed coaxially around the pulley shaft center A. Thus, the flange surface 84a and the fitting section 84b form an actuator mounting section 84. Further, a plurality of tapped holes 84c are provided on a center axis C in parallel with the pulley axis A on the flange section 84a at an equal interval.

The hydraulic actuator 90 includes a cylinder member 91 mounted on the actuator mounting section 84 of the moving sheave 80 and a piston member 95. The cylinder member 91 and the piston member 95 form an oil pressure chamber 98.

The cylinder member 91 comprises a flat mating section 92 having an annular mating surface 92a mating with the flange surface 84a and a cylindrical large diameter section 93 continuously formed around the outer periphery of the mating section 92. The mating section 92 has a fitting hole 92b fitted by the fitting section 84b of the moving sheave 80 and a plurality of boltholes 92c corresponding to the respective tapped holes 84c.

The relative location of the moving sheave 80 with respect to the cylinder member 91 is determined by fitting the fitting section 84b to the fitting hole 92b and then the cylinder member 91 is engaged with the moving sheave 80 by the bolts 94 in a state of the mating surface 92a having a tight contact with the flange surface 84a.

The piston member 95 having a hat-shaped cross section, includes a large diameter section 96 fitting to the inner periphery surface of the large diameter section 93 of the cylinder member 91 through a sealing member 96a and a small diameter section 97 coupled with a small diameter section 64 of the secondary shaft 60 and blocked by a boss 102a of a drive gear 102 through a stopper 97a.

A coil spring 99 is interposed with compression force exerted between a spring retainer 99a provided on the boss 81 and a spring retainer 99b provided on the piston member 95.

Further, an oil pressure chamber 98 is formed by the cylinder member 91 and the piston member 95 and it communicates with an oil passage 60a provided in the secondary shaft 66.

Further, the large diameter section 93 of the cylinder member 91 is connected at an end thereof with a cover member 100 and an oil pressure balancing chamber 101 is formed by the cover member 100 and the piston member 95.

The cover member 100 comprises a support section 100a and a drawing section 100b and is shaped cylindrically by drawing. The support section 100a is sealingly fitted to a fitting groove 96b formed around the inner periphery of the large diameter section 93 of the cylinder member 91, being fixed by a retaining element 103 like a snap ring. The drawing section 100b is detachedly provided around the boss 102a of the drive gear 102 which is spline-fitted to the secondary shaft 60. Therefore, an orifice is formed between the drawing section 100b of the cover member 100 and the boss 102a.

The oil pressure balancing chamber 101 which is formed by the piston member 95 and the cover member 100 communicates with another oil passage 60b provided in the secondary shaft 60 through a groove 102b formed between an end surface of the piston member 95 and an end surface of the boss 102a of the drive gear 102 and a clearance of the spline-fitting section of the drive gear 102.

In the thus constituted secondary pulley 2, when the hydraulic pressure within the oil pressure chamber 98 of the hydraulic actuator 90 increases, the cylinder member 91 is pressed toward the moving sheave 80 to move the moving sheave 80 toward the fixed sheave 70 and as a result the winding diameter of the drive belt B increases.

On the other hand, when the hydraulic pressure in the oil pressure chamber 98 decreases, the moving sheave 80 goes away from the fixed sheave 70 against the biasing force of the coil spring 99 because of the force of the drive belt B, and thereby the winding diameter of the drive belt B decreases.

When the secondary shaft 60 rotates, a centrifugal oil pressure generates in the oil pressure chamber 98 according to the rotation speed of the secondary shaft 60. Since this centrifugal oil pressure in the oil pressure chamber 98 is canceled by a centrifugal oil pressure generated in the oil pressure balancing chamber 101, the rotation speed of the secondary shaft 60 has no effect on the function of the hydraulic actuator 90.

According to this pulley structure, the relative location of the moving sheave 80 with respect to the cylinder member 91 is determined by fitting the fitting section 84b of the moving sheave 80 to the fitting hole 92b of the cylinder member 91. Then, the moving sheave 80 is rigidly connected with the cylinder member 91 by screwing the bolt 94 into the tapped hole 84c from the bolthole 92c. Thus, a uniform connecting strength can be secured between the moving sheave 80 and the cylinder member 91.

Further, according to the connecting method of the present invention, facilities such as the caulking apparatus, the press-fitting machine, the welding machine and the like are not needed and also no such failures as cracks, constrictions and the like occur. Furthermore, troublesome control of the caulking amount and deformation due to the thermal effect can be avoided. As a result, the pulley structure having high quality and low cost can be obtained.

In the operating condition, since the moving sheave 80 is connected with the cylinder member 91 by a plurality of bolts 94 in the direction of the pulley shaft center A, the flange surface 84a of the moving sheave 80 has a tight contact with the mating surface 92a over an extended area. Further, since the hydraulic pressure in the oil pressure chamber 98 presses the cylinder member 91 upon the flange surface 84a of the moving sheave 80, the contact between the flange surface 84a and the mating surface 92a is enhanced. As a result, the sealing performance between the flange surface 84a and the mating surface 92a can be secured without using sealing materials.

In the respective embodiments of the present invention, the moving sheave is connected with the cylinder member and the piston member is connected with the primary or secondary shaft, however alternatively, it is possible that the moving sheave is connected with the piston member and the cylinder member is connected with the primary or secondary shaft.

In this case, the piston member has a mating surface, a coupling hole, boltholes and the like so as to secure a tight connection between the piston member and the moving sheave.

While the presently preferred embodiments of the present invention have been shown and described, it is to be understood that these disclosures are for the purpose of illustration and that various changes and modifications may be made without departing from the scope of the invention as set forth in the appended claim.

What is claimed is:

1. A pulley structure of a belt driven continuously variable transmission, comprising:
    a pulley shaft;
    a fixed sheave formed integrally with the pulley shaft;
    a moving sheave movably mounted on the pulley shaft, wherein a groove is defined between the moving sheave and the fixed sheave, and wherein an annular flange surface is provided on a surface of the moving sheave opposite the groove;
    a hydraulic actuator for moving the moving sheave toward and away from the fixed sheave, the hydraulic actuator including:
        a cylinder member fixed to the moving sheave, wherein the cylinder member includes an annular mating section, and
        a piston member fixed on the pulley shaft and engaged with an inside surface of the cylinder member so as to define an oil pressure chamber for the hydraulic actuator between the piston member and the annular mating section of the cylinder member; and
    a bolt extending from within the oil pressure chamber and through the annular mating section of the cylinder member for fastening the annular mating section to the annular flange surface of the moving sheave.

2. The pulley structure according to claim 1, wherein the annular mating section includes a round fitting hole located within the oil pressure chamber and arranged coaxially with the pulley shaft, wherein the bolt is received within the fitting hole, and wherein the annular mating section fits to a flat surface provided on the annular flange surface of the moving sheave, wherein the annular flange surface extends cylindrically around the pulley shaft.

3. The pulley structure according to claim 1, further comprising:
    a cover member connected to an end of the cylinder member; and
    an oil pressure balancing chamber formed between the piston member and the cover member to cancel a centrifugal oil pressure generated in the oil pressure chamber.

4. The pulley structure according to claim 1, further comprising a drive belt wound around the groove.

5. A pulley structure of a belt driven continuously variable transmission, comprising:
    a pulley shaft;
    a fixed sheave formed on the pulley shaft;
    a moving sheave movable toward and away from the fixed sheave on the pulley shaft, wherein a groove is defined between the moving sheave and the fixed sheave, wherein an annular flange surface is provided on a surface of the moving sheave opposite the groove, wherein the annular flange surface is substantially perpendicular to the pulley shaft, and wherein a fitting section projects from the annular flange surface in a direction of the pulley shaft and away from the groove;
    a hydraulic actuator, including an oil pressure chamber, for moving the moving sheave toward and away from the fixed sheave, the hydraulic actuator including:
        a mating section integrally formed as a portion of the hydraulic actuator, wherein a first surface of the mating section provides a wall of the oil pressure chamber,
        a mating surface provided on the mating section for contacting the flange surface of the moving sheave over an extended area, wherein the mating surface is located on an opposite side of the mating section from the first surface,
        a fitting surface provided on the mating section for contacting the fitting section of the moving sheave, wherein the fitting surface extends in the direction of the pulley shaft, and
        a round fitting hole defined through the first surface and the mating surface of the mating section coaxial with the pulley shaft; and
    a bolt extending from the oil pressure chamber through the round fitting hole and fastening the mating section with the flange surface of the moving sheave.

6. The pulley structure according to claim 5 further comprising a drive belt wound around the groove.

* * * * *